(12) United States Patent
Simonneaux

(10) Patent No.: US 12,122,506 B2
(45) Date of Patent: Oct. 22, 2024

(54) AIRCRAFT HAVING OUTRIGGER LANDING GEAR

(71) Applicant: SAFRAN LANDING SYSTEMS UK LTD, Gloucester (GB)

(72) Inventor: Yann Simonneaux, Gloucester (GB)

(73) Assignee: SAFRAN LANDING SYSTEMS UK LTD (GB)

( * ) Notice: Subject to any disclaimer, the term of this patent is extended or adjusted under 35 U.S.C. 154(b) by 75 days.

(21) Appl. No.: 17/603,678

(22) PCT Filed: Apr. 15, 2020

(86) PCT No.: PCT/EP2020/060595
§ 371 (c)(1),
(2) Date: Oct. 14, 2021

(87) PCT Pub. No.: WO2020/212424
PCT Pub. Date: Oct. 22, 2020

(65) Prior Publication Data
US 2022/0297825 A1 Sep. 22, 2022

(30) Foreign Application Priority Data
Apr. 15, 2019 (EP) .................................. 19169336

(51) Int. Cl.
*B64C 25/12* (2006.01)
*B64C 1/26* (2006.01)
(Continued)

(52) U.S. Cl.
CPC ............... *B64C 25/12* (2013.01); *B64C 1/26* (2013.01); *B64C 3/18* (2013.01); *B64C 25/04* (2013.01)

(58) Field of Classification Search
CPC ........... B64C 25/12; B64C 25/04; B64C 1/26; B64C 25/10; B64C 3/18
See application file for complete search history.

(56) References Cited

U.S. PATENT DOCUMENTS 1,835,368 A * 12/1931 Bellanca .................. B64C 25/12
244/102 R
4,053,125 A * 10/1977 Ratony .................. B64C 39/068
244/45 R
(Continued)

FOREIGN PATENT DOCUMENTS

| CN | 102458988 | 5/2012 |
| CN | 107914869 | 4/2018 |

(Continued)

OTHER PUBLICATIONS

"Graham Pash et al., Analysis of a Aircraft Landing Gear Suspension System, Nov. 15, 2018, pp. 3-4" (Year: 2018).*
(Continued)

*Primary Examiner* — Richard Green
*Assistant Examiner* — Nevena Aleksic
(74) *Attorney, Agent, or Firm* — Buchanan Ingersoll & Rooney PC

(57) ABSTRACT

An aircraft comprising a fuselage, a pair of wings connected to an upper portion of the fuselage, and a pair of wing support struts, each wing support strut being connected between a lower portion of the fuselage and an underside of the adjacent wing, wherein at least one centre landing gear assembly is connected to the fuselage and is configured to be retractable within the fuselage, and a respective outrigger landing gear is connected to each wing support strut, each outrigger landing gear being configured to be retractable within the respective wing support strut.

18 Claims, 3 Drawing Sheets

(51) Int. Cl.
  *B64C 3/18* (2006.01)
  *B64C 25/04* (2006.01)

(56) References Cited

U.S. PATENT DOCUMENTS

| | | | | |
|---|---|---|---|---|
| 5,417,386 | A | * 5/1995 | Wernicke | B64C 37/00 |
| | | | | 244/45 R |
| 5,645,250 | A | * 7/1997 | Gevers | B64D 29/04 |
| | | | | 244/50 |
| 8,186,617 | B2 | * 5/2012 | Llamas Sandin | B64C 39/068 |
| | | | | 244/45 R |
| 2007/0032931 | A1 | * 2/2007 | Makinadjian | B64C 25/60 |
| | | | | 701/3 |
| 2010/0276535 | A1 | * 11/2010 | Charuel | B64C 25/405 |
| | | | | 244/50 |
| 2012/0160968 | A1 | * 6/2012 | Barmichev | B64D 11/00 |
| | | | | 244/45 R |
| 2015/0069178 | A1 | 3/2015 | Brown et al. | |
| 2016/0068260 | A1 | 3/2016 | Khorrami | |
| 2016/0221669 | A1 | * 8/2016 | Didey | B64C 25/34 |
| 2019/0135416 | A1 | * 5/2019 | Woolcock | B64C 25/20 |
| 2019/0300143 | A1 | * 10/2019 | Harrison | B64C 1/26 |
| 2020/0140072 | A1 | * 5/2020 | Blacha | B64C 27/24 |

FOREIGN PATENT DOCUMENTS

| | | | |
|---|---|---|---|
| DE | 746811 C | * 4/1941 | ............ B64C 25/10 |
| EP | 3546349 A1 | 10/2019 | |
| KR | 20110116394 | 10/2011 | |

OTHER PUBLICATIONS

Anonymous: "Airbus A340 Photos", Aug. 21, 2013 (Aug. 21, 2013), XP055631652, Retrieved from the Internet: URL: https://www.airbus.com/search.image.html?tags=products-and-solutions:commercial-aircraft/a340-family/a340-600&tagLogicChoice=0R#/searchresult-image-all-23, download from the internet Oct. 4, 2021, 4 pages.

International Search Report and Written Opinion for International Application No. PCT/EP2020/060595, dated Jul. 21, 2020, 10 pages.

English translation of the Chinese Office Action for Chinese Application No. 202080029102.X, dated Dec. 28, 2023, 9 pages.

* cited by examiner

AIRCRAFT HAVING OUTRIGGER LANDING GEAR

This application is a U.S. National Phase application of PCT International Application No. PCT/EP2020/060595, filed Apr. 15, 2020, which claims the benefit of European Application No. 19169336.5, filed Apr. 15, 2019, both of which are incorporated by reference herein.

BACKGROUND

The vast majority of commercial airliners follow the same basic design of having the wings connected to the fuselage at or towards the bottom of the fuselage section with each wing housing at least one retractable main landing gear designed to fully retract into the wing. A central nose gear mounted towards the front of the fuselage completes the landing gear configuration in what is generally referred to as a tricycle arrangement. Examples of such aircraft include the Boeing 737 series and Airbus A320 series.

However, there is an increasing interest in providing an airliner of comparable dimensions having a high mounted pair of wings, with each wing mounted substantially at the top of the fuselage. It is currently thought that such a design will bring improvements in reduced drag of the aircraft and therefore increase efficiency of operation. It is already known for some small passenger aeroplanes to have such high mounted wings, for example the British Aerospace 146 (BAe 146). However, such aircraft typically have main landing gears that are mounted on the fuselage such as the BAe 146. To mount the main landing gear on the wings for a high mounted wing aircraft would be particularly problematic since each landing gear would have to be of significant length to reach from the high mounted wing to the ground when extended, which would then in turn pose problems of having sufficient space within the wing structure to accommodate the landing gear when retracted. Whilst mounting the main landing gear in the fuselage avoids these issues, it presents other problems. The main problem for the fuselage mounted landing gear is that the track (width) of the landing gear is narrower than a wing mounted landing gear and it is therefore difficult to achieve satisfactory stability of the aircraft whilst on the ground as the turnover angle is close to the recommended 60-63° limit. To increase stability the track of the main landing gear needs to be increased. Whilst this can be achieved for fuselage mounted landing gear by extending the landing gear attachment points outside the nominal envelope of the fuselage, this will result in a relatively large landing gear fairing being required to enclose the landing gear when the landing gear is retracted during flight. Such fairings are undesirable since they increase drag.

Other solutions for high mounted wings include that adopted by smaller passenger aircraft, such as the Bombardier Dash 8, in which the main landing gear is mounted in the engine housings, with each wing having an engine housing mounted to it. However, for larger passenger aircraft of similar size to the Boeing 737 or A320 jet turbine engines would be required (as opposed to the turbo prop engines of the Dash 8) which would preclude the landing gear from being accommodated within the overall engine housing.

An alternative solution for a high wing mounted aircraft is therefore required.

SUMMARY OF THE INVENTION

According to a first aspect of the present invention there is provided an aircraft comprising a fuselage, a pair of wings connected at respective wing mounting points to an upper portion of the fuselage, and a pair of wing support struts, each wing support strut being connected between an underside of the adjacent wing and a portion of the fuselage lower than the wing mounting point, wherein the aircraft further comprises a nose landing gear and the aircraft further comprises a nose landing gear and at least one centre main landing gear assembly, the at least one centre main landing gear assembly being connected to the fuselage and is configured to be retractable within the fuselage, and wherein a respective outrigger landing gear is connected to each wing support strut, each outrigger landing gear being configured to be retractable within the respective wing support strut.

Advantages of this aircraft configuration include increased stability provided by the wide track of the outrigger landing gear, whilst the provision of the central landing gear unit allows the majority of the aircraft weight on the ground to be carried by the centre landing gear, thus allowing the outrigger landing gears to be of sufficiently reduced dimensions so that they may be fully retracted within the wing support struts. Additionally, the inclusion of wing support struts reduces the overall length of the outrigger landing gears required for the desired track width.

When retracted, each outrigger landing gear is preferably fully enclosed within the respective wing support strut. Alternatively, wherein when retracted a portion of each outrigger landing gear may be enclosed within the fuselage. It is advantageous for the outrigger landing gears to be enclosed so as to avoid drag inducing fairings.

When retracted, the centre main landing gear is preferably enclosed within the fuselage. Again, this is advantageous to avoid landing gear fairings and therefore minimise drag.

Each outrigger landing gear preferably includes one or more wheels and a wheel drive system configured to drive at least one of the wheels. The motor is preferably an electrically powered motor.

It is advantageous to be able to power the outrigger landing gear to enable the aircraft to manoeuver on the ground without the use of the main engines.

Each outrigger landing gear and/or the centre main landing gear may include a load adjustment mechanism configured to apply a bias force to the respective landing gear in response to a control input to vary the load applied by the landing gear to the ground.

It is advantageous to be able to actively control the load applied by the landing gear so as to selectively increase or decrease the loading on the respective landing gear so as to improve braking performance or the ability to drive the landing gear wheels by the aforementioned motor.

Each outrigger landing gear or the centre landing gear preferably includes a shock absorber strut and the load adjustment mechanism is configured to apply the bias force to the shock absorber strut.

Each outrigger landing gear preferably has a first damping ratio that is less than a damping ratio of the main landing gear. This is advantageous in avoiding large loads being passed into the outrigger landing gear during landing and allowing the wings to roll during landing.

Additionally, each outrigger landing gear may have a second damping ratio greater than the first damping ratio, wherein the first damping ratio is effective over a first portion of travel of the outrigger landing gear and the second damping ratio is effective over a second portion of travel of the outrigger landing gear, the outrigger landing gear being further compressed over the second portion of travel than over the first portion. This mitigates against excessive wing roll during landing.

The centre landing gear is preferably symmetrically mounted to the fuselage with respect to a longitudinal plane of symmetry of the aircraft. This is advantageous since it maximises the possibilities of avoiding the use of landing gear fairings when the gear is retracted.

Each outrigger landing gear may be unbraked. The absence of brakes on the outrigger landing gear may be advantageous to avoid unnecessary weight of the landing gear, since the braking function may be performed by the centre landing gear. Each centre landing gear may include at least two axles mounted to a bogie beam.

Each wing support strut is preferably connected to the fuselage further aft than the location at which the wing support strut is connected to the respective wing. This facilitates in the wheel contact point being aft of the aircraft centre of gravity.

BRIEF DESCRIPTION OF THE DRAWINGS

Some embodiments of the present invention will now be described, by way of illustrative example only, with reference to the accompanying Figures, of which.

DETAILED DESCRIPTION OF ILLUSTRATIVE EMBODIMENTS

Figure 1:
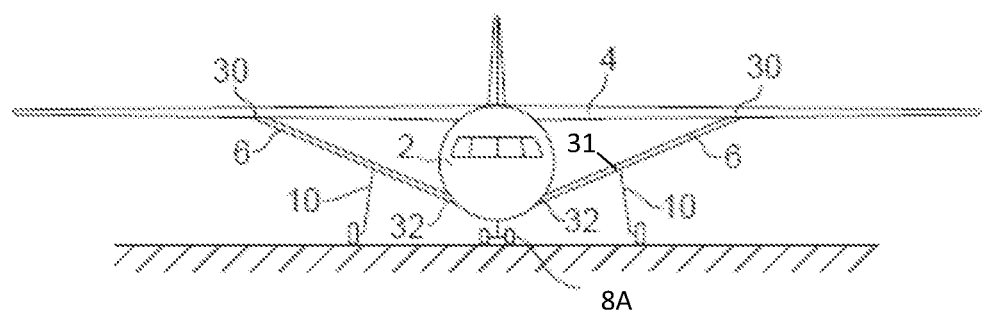
FIGS. 1 and 2 schematically illustrate an aircraft and associated landing gear arrangement according to an embodiment of the present invention.
Figure 2:
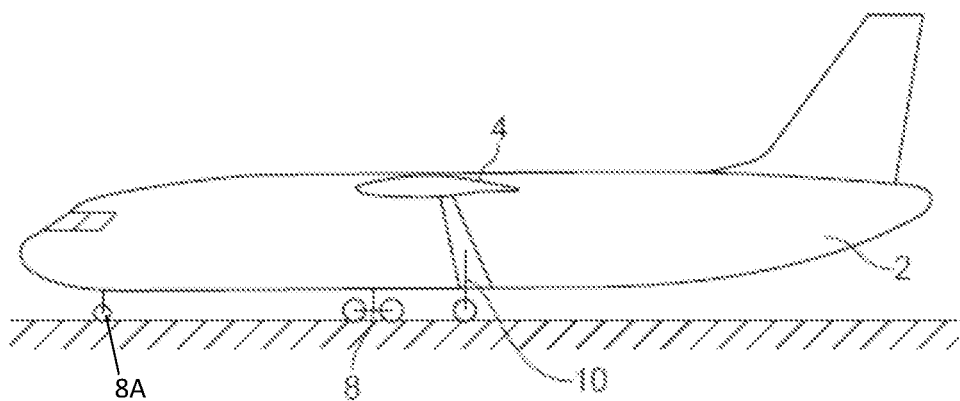

FIGS. 1 and 2 schematically illustrate an aircraft according to an embodiment of the present invention. The aircraft has a fuselage 2 of a generally tubular shape as is well known in the art and a pair of wings 4 connected to an upper portion of the fuselage. In this context the term 'upper portion' can mean any portion of the fuselage that is located higher (relative to the normal attitude of the aircraft in level flight or when on the ground) than the horizontal median plane of the fuselage. A respective fixed wing support strut 6 is connected between a first connection location 30 at the underside of a respective wing 4 and a second connection location 32 at a lower portion of the fuselage 2. Each outrigger landing gear 10 is connected to its respective wing support strut 6 at a respective third connection location 31 that is located (i) at an elevation between the respective first connection location 30 and the respective second connection location 32, and (ii) at an elevation above the centre main landing gear assembly 8. Each wing support strut 6 extends straight from the respective first connection location 30 to the respective second connection location 32. Each outrigger landing gear 10 is connected to the respective wing support strut 6 at a location vertically between the respective first connection location 30 and the respective second connection location 32. Each wing support strut 6 extends straight from the respective first connection location 30 to the respective second connection location 32. In this context the term 'lower portion' can mean any portion of the fuselage that is located lower (relative to the normal attitude of the aircraft in level flight or when on the ground) than the portion of the fuselage to which the wing is connected. Each wing support strut 6 preferably has an aerofoil cross-section. A main landing gear 8 is mounted to the fuselage in a substantially central position relative to the vertical plane of symmetry of the aircraft, i.e. substantially central when viewed head-on from the nose of the aircraft. A nose landing gear assembly 8a is connected to the fuselage and configured to be retractable within the fuselage 2. The nose landing gear assembly 8a is positioned forward of the centre main landing gear 8 and each outrigger landing gear 10 as viewed in a flight direction of travel of the aircraft. In the embodiment illustrated a single central main landing gear is provided comprising a pair of axles connected to a bogie beam, the bogie beam in turn being connected by a shock absorber strut to the fuselage structure. In other respects the central main landing gear is of conventional design. In other embodiments, not illustrated, more than one central main landing gear assembly may be provided, either in a tandem (bicycle) arrangement with both landing gear assemblies being substantially centrally mounted to the fuselage, or alternatively with each landing gear assembly being side by side and equidistant from the centre line of the aircraft (for example, in a similar arrangement to the fuselage mounted landing gear of an Airbus A380). The arrangement of the central landing gear will largely be dictated by the weight and dimensions of the aircraft and the proportion of the aircraft weight to be carried by the centre main landing gear whilst the aircraft is on the ground. In some embodiments the main landing gear may comprise arrangement other than a multi-axle bogie beam. For example the main landing gear may simply comprise one or more dual wheel shock absorber struts.

In preferred embodiments the central main landing gear and fuselage are configured such that when retracted (i.e. stowed), the central main landing gear is fully enclosed within the fuselage. However, in other embodiments it may be that whilst the majority of the central main landing gear, when retracted, is enclosed by the fuselage, i.e. is located within the nominal fuselage cross-section, a small portion of the main landing gear remains outside the nominal fuselage cross-section and that a small belly fairing is required to fully enclose the main landing gear. In such embodiments it is envisaged that the belly fairing has a cross-sectional area of no more than 5% of the nominal fuselage cross-sectional area.

As illustrated in FIGS. 1 and 2, the aircraft also includes an outrigger landing gear 10 mounted to the underside of each wing support strut 6. Each outrigger landing gear is arranged to be fully retractable within the body of each respective wing support strut in an analogous manner to wing mounted landing gear known from conventional aircraft arrangements. The provision of the wing support strut 6 not only provides structural rigidity to the wings 4, but enables the outrigger landing gear to be shorter for any given track width than if they were mounted on the wings themselves.

Figure 3:
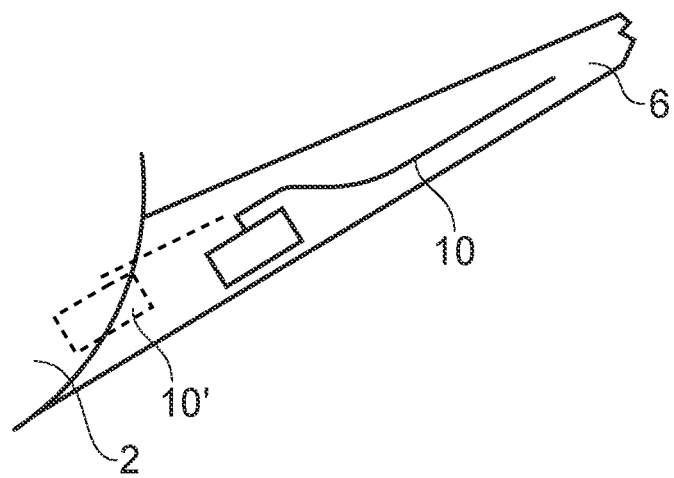
FIG. 3 schematically illustrates an outrigger landing gear retracted within a wing support strut.

As each outrigger landing gear only needs to support a relatively small percentage (15-20%) of the weight supported by the central landing gear, each outrigger landing gear need only be of relatively small dimensions. For example, each outrigger landing gear may only require a single wheel, although other arrangements, such as a single axle/twin wheel arrangements may be used as necessary or desirable. This reduced physical size of the outrigger landing gear facilitates their complete enclosure by the wing support struts when retracted. FIG. 3 schematically illustrates a portion of a wing support strut 6 connected to a lower portion of the fuselage 2 with an outrigger landing gear illustrated in a fully retracted position. As illustrated in FIG. 3, the outrigger landing gear when retracted is fully enclosed by the structure of the wing support strut 6. The wing support strut may be constructed in a similar manner to the wings, that is with a front and rear spar with an upper and lower aerodynamic skin. The outrigger landing gear 10 may be mounted between the front and rear spars, the reduced load requirement of the outrigger landing gears allowing it to be dimensioned so as to fit fully within the space provided between the front and rear spars and the upper and lower skin. In some further embodiments it may be that a relatively small portion of each outrigger landing gear (for example, a portion of the wheel) is located within the fuselage when the outrigger landing gear is retracted in an analogous manner to conventional wing mounted landing gear. An example of a portion of a landing gear 10' being located within the fuselage 4 is shown schematically in FIG. 3. In such embodiments a small belly fairing is provided to ensure the outrigger landing gear is fully enclosed.

Figure 4:
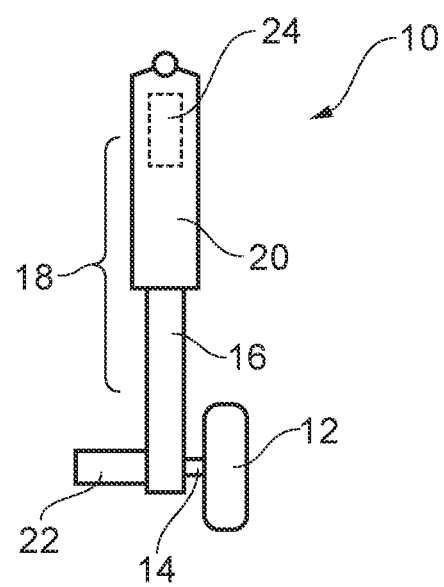
FIGS. 4 and 5 schematically illustrate possible arrangements of outrigger landing gear according to embodiments of the present invention.

In preferred embodiments the outrigger landing gear 10 does not include any brakes, i.e. the gear is unbraked. This further reduces the weight and physical dimensions of the outrigger landing gear, therefore further facilitating its enclosure within the wing support strut when retracted. The absence of brakes from the outrigger landing gear also removes the need to route brake control lines, such as hydraulic lines or electrical cables, to the outrigger landing gear, again facilitating a simpler construction of the landing gear and the wing support struts. In preferred embodiments each outrigger landing gear is provided with a wheel drive system configured to provide a driving force to the outrigger landing gear wheel. FIG. 4 schematically illustrates a possible arrangement of an outrigger landing gear in which a single wheel 12 is supported by a stub axle 14 mounted to the bottom of the sliding tube 16 of a shock absorber strut 18. The shock absorber strut 18 has an upper housing 20 in which the sliding tube 16 is received and in which the sliding tube may move in and out of. Also mounted to the lower portion of the sliding tube 16 is a wheel drive system 22 that is arranged to provide a driving force to the wheel 12. The wheel drive system preferably includes a motor, such as an electrical motor or a hydraulic motor, a gearbox, a clutch, and a control unit. However, in some embodiments one or more of the above listed drive system components may be mounted on the aircraft other than on the outrigger landing gear. For example, the control unit may be separately mounted from the remaining elements of the wheel drive systems. By providing the ability to drive the wheels of the outrigger landing gear the aircraft may be manoeuvred whilst on the ground without the use of the main propulsive engines. This is considered to be advantageous due to the potential fuel savings when not using the main propulsive engines for ground manoeuvring, such as taxiing.

Moreover, in embodiments where the outrigger landing gear wheels are powered, the absence of any brakes on the outrigger landing gear ensures the total separation of the powered wheel and braking systems which is an important safety consideration.

In some circumstances it may be desirable to increase the load applied by each outrigger landing gear to the ground, for example in the case that each outrigger landing gear is independently powered then it may be desirable to increase the load exerted by the outrigger landing gears to the ground to increase traction of the wheel 12 with the ground. To achieve this, in some embodiments each outrigger landing gear 10 includes a load adjustment mechanism, schematically illustrated as element 24 in FIG. 4. The load adjustment mechanism 24 is configured to exert a bias force to the outrigger landing gear so as to vary the load applied by the outrigger gear wheel to the ground. The load adjustment mechanism 24 may, for example, be formed by one or more mechanical linkages located within the outer housing 20 of the support strut 18 that is configured to mechanically apply a bias force to the sliding tube 16 by means of one or more appropriate actuators, such that the bias force exerts either an extension or retraction force on the sliding tube 16. In most circumstances, to increase the loading of the landing gear wheel 12 on the ground, the load adjustment mechanism is configured to exert a biasing force that acts to exert an extension force on the sliding tube 16 of the support strut 18, thus effectively "pushing" the landing gear 12 into the ground and thereby increasing traction. Other possible arrangements for the load adjustment mechanism 24 may be envisaged that achieve the same desired effect of applying a variable bias force to the landing gear, for example a hydraulic or pneumatic assembly may be provided that is configured to increase or decrease the gas and/or oil pressure within the support strut 18 of the outrigger landing gear 10. Of course, other suitable load adjustment mechanisms that would be apparent to the skilled person may be applied.

In further embodiments, the centre landing gear may additionally or alternatively also include a load adjustment mechanism in an analogous manner to the load adjustment mechanism described above with respect to the outrigger landing gear. In such embodiments, a bias force may be exerted to the centre landing gear so as to reduce the load applied by the centre landing gear to the ground, and thereby indirectly increase the load applied by the outrigger landing gear, due to the increased proportion of aircraft ground weight being carried by the outrigger landing gear. This would also increase the traction provided by the outrigger landing gear in the case of the outrigger landing gear being powered. Alternatively, or additionally, the centre landing gear may, by means of the load adjustment mechanism, apply a bias force to the centre landing gear that exerts an extension bias force having the effect of pushing the centre landing gear more firmly to the ground, for example in order to increase braking capability of the centre landing gear during the landing phase.

It is preferable for the outrigger landing gear to have lower damping ratio than the main landing gear, i.e. for the outrigger landing gear to be more easily compressed than the main landing gear for any given load. This is to ensure that during a landing event the main landing gear carries the greater load, since the outrigger landing gear is physically smaller and therefore cannot carry large loads. In particular, this also allows the aircraft wings to experience some roll during landing without exerting a large load on the outrigger landing gear. In this manner the outrigger landing gear behaves predominantly as a pure spring. However, it is also preferable for the outrigger landing gears to have two-stage damping, with the previously discussed relatively low damping ratio over the majority of the travel of the landing gear but a higher damping ratio over a final (compressed) portion of travel. This enables the outrigger landing gear to prevent, or at least mitigate against, excessive wing roll angles (since the higher damping ratio acts against the further compression of the outrigger landing gear) that might otherwise result in the tip of the wing contacting the ground. Shock absorber struts having multiple damping stages, and optionally multiple spring rates, are known in the art.

Figure 5:
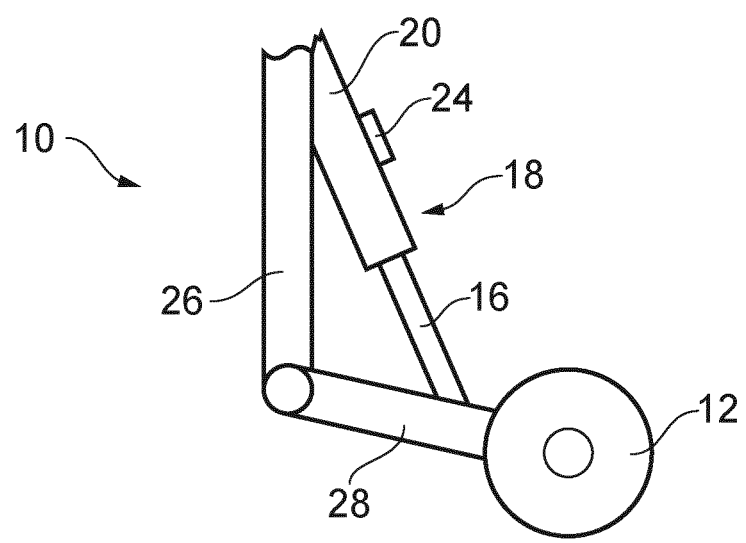

FIG. 5 schematically illustrates an alternative embodiment for an outrigger landing gear 10 according to embodiments of the present invention. In the alternative arrangement schematically illustrated in FIG. 5, a rigid support strut 26 is arranged to be connected to a wing support strut at one end, and arranged to be pivotally connected to one end of a trailing arm 28 at its other end. The landing gear wheel 12 is pivotally connected to the opposite end of the trailing arm 28 in a known manner and configuration. A telescopic shock absorber strut 18 is connected between the support strut 26 and trailing arm 28 in a conventional manner, with the outer housing 20 connected to the support strut 26 and the sliding tube 16 supported to the trailing arm 28. In the arrangement shown in FIG. 5, the load adjustment mechanism 24 is illustrated as being externally located to the outer housing 20 of the shock absorber strut 18. The arrangement of FIG. 5 may also be suitable for the centre landing gear.

For aircraft with conventional arranged 'tricycle' landing gear it is generally desirable for the ground contact point of the main landing gear to be aft of (but still relatively close to) the aircraft's centre of gravity. In some embodiments of the present invention this is achieved by configuring the wing support struts 26 such that when viewed from the side of the aircraft each support strut 26 is at an angle with respect to the vertical, with the lower end of each support strut (where it connects to the fuselage) being located further aft than the upper end of the support strut. Typically, the angle contended by a straight line between the outrigger landing gear wheel and the aircraft's centre of gravity and the vertical is in the range of 6° to 20°. The inclination of the support struts 26 is illustrated in FIG. 2.

The combination of fuselage mounted centre landing gear and wing support strut trigger landing gear for an aircraft having a high mounted wing provides a landing gear arrangement having the desired degree of stability when on the ground, by virtue of a relatively wide track between the outrigger landing gears, yet enabling each outrigger landing gear to be of sufficiently reduced dimensions to allow them to be completely housed within the wing support struts when in the retracted position. The track width of the outrigger landing gears allows the aircraft's turnover angle to be no more than the recommended maximum of 65°.

The invention claimed is:

1. An aircraft comprising:
a fuselage;
a pair of wings, wherein each wing is connected at a respective wing mounting point to an upper portion of the fuselage;
a pair of wing support struts, wherein each wing support strut is connected to an underside of a respective adjacent wing at a respective first connection location, and connected to a respective portion of the fuselage at a respective second connection location, wherein the respective second connection location is lower than the respective wing mounting point of the respective adjacent wing, and wherein the second connection location is positioned no further aft, as viewed in a flight direction of travel of the aircraft, than a trailing edge of the respective wing at the respective wing mounting point;
at least one centre main landing gear assembly connected to the fuselage and configured to be retractable within the fuselage;
a respective outrigger landing gear connected to each wing support strut at a respective third connection location, each outrigger landing gear being configured to be retractable within the respective wing support strut, wherein each third connection location is located (i) at an elevation between the respective first connection location and the respective second connection location, and (ii) at an elevation above the at least one centre main landing gear assembly;
and a nose landing gear assembly connected to the fuselage and configured to be retractable within the fuselage, the nose landing gear assembly being positioned forward of the at least one centre main landing gear assembly and each outrigger landing gear as viewed in a flight direction of travel of the aircraft.

2. The aircraft according to claim 1, wherein when retracted each outrigger landing gear is fully enclosed within the respective wing support strut.

3. The aircraft according to claim 1, wherein when retracted a portion of each outrigger landing gear is enclosed within the fuselage.

4. The aircraft according to claim 1, wherein when retracted the at least one centre main landing gear is fully enclosed within the fuselage.

5. The aircraft according to claim 1, wherein each outrigger landing gear includes one or more respective wheels and a respective wheel drive system configured to drive at least one of the wheels.

6. The aircraft according to claim 5, wherein the wheel drive system includes an electrically powered motor.

7. The aircraft according to claim 1, wherein each outrigger landing gear includes a respective load adjustment mechanism configured to apply a bias force to the outrigger landing gear in response to a control input, to vary a load applied by the outrigger landing gear to the ground.

8. The aircraft according to claim 1, wherein the at least one centre main landing gear includes a load adjustment mechanism configured to apply a bias force to the at least one centre main landing gear in response to a control input to vary a load applied by the centre main landing gear to the ground.

9. The aircraft according to claim 7, wherein each outrigger landing gear or at least one centre main landing gear includes a respective shock absorber strut and the respective load adjustment mechanism is configured to apply the bias force to the respective shock absorber strut.

10. The aircraft according to claim 1, wherein each outrigger landing gear has a respective first damping ratio that is less than a respective damping ratio of the at least one main landing gear.

11. The aircraft according to claim 10, wherein each outrigger landing gear has a respective second damping ratio greater than the respective first damping ratio, wherein the respective first damping ratio is effective over a respective first portion of travel of the respective outrigger landing gear and the respective second damping ratio is effective over a respective second portion of travel of the respective outrigger landing gear, the respective outrigger landing gear being further compressed over the respective second portion of travel than over the respective first portion of travel.

12. The aircraft according to claim 1, wherein each at least one centre main landing gear is symmetrically mounted to the fuselage with respect to a longitudinal plane of symmetry of the aircraft.

13. The aircraft according to claim 1, wherein each outrigger landing gear is unbraked.

14. The aircraft according to claim 1, wherein each at least one centre main landing gear includes at least two axles mounted to a bogie beam.

15. The aircraft according to claim 1, wherein the respective second connection location of each wing support strut is connected to the fuselage at a location further aft, relative to the flight direction of the aircraft, than the respective first connection location of each wing support strut.

16. The aircraft according to claim 8, wherein each outrigger landing gear or the at least one centre main landing gear includes a respective shock absorber strut and the respective load adjustment mechanism is configured to apply the bias force to the respective shock absorber strut.

17. The aircraft according to claim 1, wherein each wing support strut spans in a direct line from the respective first connection location to the respective second connection location.

18. An aircraft comprising:
a fuselage;
a pair of wings, wherein each wing is connected at a respective wing mounting point to an upper portion of the fuselage;
a pair of wing support struts, wherein each wing support strut is connected to an underside of a respective adjacent wing at a respective first connection location, and connected to a respective portion of the fuselage at a respective second connection location, wherein the respective second connection location is lower than the respective wing mounting point of the respective adjacent wing, and wherein each wing support strut extends in a direct line from the respective first connection location to the respective second connection location;
at least one centre main landing gear assembly connected to the fuselage and configured to be retractable within the fuselage;
a respective outrigger landing gear connected to each wing support strut at a respective third connection location, each outrigger landing gear being configured to be fully retractable within the respective wing support strut, wherein each third connection location is located (i) at an elevation between the respective first connection location and the respective second connection location, (ii) at an elevation above the at least one centre main landing gear assembly, and (iii) approximately at a midpoint of the respective wing support strut;
and a nose landing gear assembly connected to the fuselage and configured to be retractable within the fuselage, the nose landing gear assembly being positioned forward of the at least one centre main landing gear assembly and each outrigger landing gear as viewed in a flight direction of travel of the aircraft.

* * * * *